US007371459B2

(12) United States Patent
Galla

(10) Patent No.: US 7,371,459 B2
(45) Date of Patent: May 13, 2008

(54) ELECTRICAL DEVICES HAVING AN OXYGEN BARRIER COATING

(75) Inventor: Matthew P. Galla, San Francisco, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 309 days.

(21) Appl. No.: 10/934,349

(22) Filed: Sep. 3, 2004

(65) Prior Publication Data

US 2006/0051588 A1 Mar. 9, 2006

(51) Int. Cl.
*B32B 27/38* (2006.01)
*C23F 11/00* (2006.01)

(52) U.S. Cl. ...................... 428/414; 428/402; 428/413; 428/418; 428/457; 428/689; 428/697; 252/389.3; 252/389.52; 252/389.53

(58) Field of Classification Search ................ 428/413, 428/414

See application file for complete search history.

(56) References Cited

U.S. PATENT DOCUMENTS

| | | | | | |
|---|---|---|---|---|---|
| 3,683,044 | A | | 8/1972 | Huang et al. | 260/830 TW |
| 3,755,698 | A | * | 8/1973 | Trott | 310/322 |
| 3,858,144 | A | * | 12/1974 | Bedard et al. | 338/22 R |
| 4,177,376 | A | * | 12/1979 | Horsma et al. | 338/22 R |
| 4,237,441 | A | | 12/1980 | Van Konynenburg et al. | 338/22 R |
| 4,315,237 | A | | 2/1982 | Middleman et al. | 338/22 R |
| 4,388,607 | A | | 6/1983 | Toy et al. | 338/22 SD |
| 4,534,889 | A | | 8/1985 | Van Konynenburg et al. | 252/511 |
| 4,545,926 | A | | 10/1985 | Fouts et al. | 252/511 |
| 4,560,498 | A | | 12/1985 | Horsma et al. | 252/511 |
| 4,591,700 | A | | 5/1986 | Sopory | 219/505 |
| 4,605,765 | A | | 8/1986 | Miyamoto et al. | 564/367 |
| 4,689,475 | A | | 8/1987 | Kleiner et al. | 219/553 |
| 4,724,417 | A | | 2/1988 | Au et al. | 338/22 R |
| 4,774,024 | A | | 9/1988 | Deep et al. | 252/511 |
| 4,800,253 | A | | 1/1989 | Kleiner et al. | 219/553 |
| 4,935,156 | A | | 6/1990 | Van Konynenburg et al. | 219/553 |
| 5,049,850 | A | | 9/1991 | Evans et al. | 338/22 R |
| 5,115,299 | A | * | 5/1992 | Wright | 257/668 |
| 5,250,228 | A | | 10/1993 | Baigrie et al. | 252/511 |
| 5,300,541 | A | | 4/1994 | Nugent, Jr. et al. | 523/414 |
| 5,358,793 | A | * | 10/1994 | Hanada et al. | 428/560 |
| 5,378,407 | A | | 1/1995 | Chandler et al. | 252/513 |
| 5,438,109 | A | | 8/1995 | Nugent, Jr. et al. | 525/526 |
| 5,470,622 | A | * | 11/1995 | Rinde et al. | 428/34.9 |

(Continued)

FOREIGN PATENT DOCUMENTS

EP 0406639 A 1/1991

(Continued)

OTHER PUBLICATIONS

Search Report for European Application No. 05108043.0, mailed Nov. 17, 2005.

*Primary Examiner*—Randy Gulakowski
*Assistant Examiner*—John J. Figueroa

(57) ABSTRACT

An electrical device includes two electrodes and a conductive polymer layer, containing a mixture of a polymer and a conductive filler, separating the electrodes. A oxygen barrier material containing a thermosetting polymer component is present on the exposed surface of the conductive polymer layer that is not in contact with the laminar electrodes. The oxygen barrier material may be a polyamine-polyepoxide material, and may provide for acceptable barrier properties over a wide range of humidity levels.

18 Claims, 5 Drawing Sheets

U.S. PATENT DOCUMENTS

| | | | | |
|---|---|---|---|---|
| 5,491,204 | A | 2/1996 | Nugent, Jr. et al. | 525/523 |
| 5,637,365 | A | 6/1997 | Carlblom | 428/35.4 |
| 5,840,825 | A | 11/1998 | Carlblom et al. | 528/18.3 |
| 5,874,885 | A * | 2/1999 | Chandler et al. | 338/22 R |
| 6,005,198 | A * | 12/1999 | Gregoire | 174/262 |
| 6,010,757 | A * | 1/2000 | Yamamoto et al. | 428/1.25 |
| 6,083,615 | A * | 7/2000 | Long et al. | 428/323 |
| 6,369,148 | B2 * | 4/2002 | Chiang et al. | 524/417 |
| 6,527,976 | B1 * | 3/2003 | Cai et al. | 252/188.28 |
| 6,570,483 | B1 | 5/2003 | Chandler et al. | 338/22 R |
| 6,778,062 | B2 * | 8/2004 | Handa et al. | 338/22 R |
| 2003/0151025 | A1 | 8/2003 | Yang et al. | 252/188.28 |
| 2005/0006253 | A1 * | 1/2005 | Samproni | 205/778.5 |
| 2005/0030689 | A1 * | 2/2005 | Toth et al. | 361/103 |

FOREIGN PATENT DOCUMENTS

| | | | |
|---|---|---|---|
| JP | 49-14211 | | 4/1974 |
| JP | 52-18758 | | 5/1977 |
| JP | 55-98801 | A | 7/1980 |
| JP | 9-511537 | A | 11/1997 |
| JP | 2000-510192 | A | 8/2000 |
| JP | 2002-175903 | A | 6/2002 |
| WO | WO95/26997 | A1 | 10/1995 |
| WO | WO 96/18669 | A | 6/1996 |

* cited by examiner

ELECTRICAL DEVICES HAVING AN OXYGEN BARRIER COATING

BACKGROUND OF THE INVENTION

1. Field of the Invention

This invention relates to conductive polymer compositions, methods of making such compositions, and electrical devices comprising such compositions.

2. Introduction to the Invention

Conductive polymer compositions and electrical devices comprising them are well known. Such compositions comprise a polymer and, dispersed in the polymer, a particulate conductive filler. The type and quantity of the conductive particles, as well as the type of the polymer, influence the resistivity of the composition. For compositions with resistivities greater than about 1 ohm-cm, carbon black is a preferred filler. For compositions with lower resistivities, metal particles are used. Compositions comprising carbon black are described, for example, in U.S. Pat. No. 4,237,441 (van Konynenburg et al.), U.S. Pat. No. 4,388,607 (Toy et al.), U.S. Pat. No. 4,534,889 (van Konynenburg et al.), U.S. Pat. No. 4,560,498 (Horsma et al.), U.S. Pat. No. 4,591,700 (Sopory), U.S. Pat. No. 4,724,417 (Au et al.), U.S. Pat. No. 4,774,024 (Deep et al.), U.S. Pat. No. 4,935,156 (van Konynenburg et al.), and U.S. Pat. No. 5,049,850 (Evans et al.). Compositions comprising metal fillers are described, for example, in U.S. Pat. No. 4,545,926 (Fouts et al.), U.S. Pat. No. 5,250,228 (Baigrie et al.), and U.S. Pat. No. 5,378,407 (Chandler et al.). The disclosure of each of these patents is incorporated herein by reference.

The electrical properties of conductive polymer composition tend to deteriorate over time. For example, in metal-filled conductive polymer compositions, the surfaces of the metal particles tend to oxidize when the composition is in contact with an ambient atmosphere, and the resultant oxidation layer reduces the conductivity of the particles when in contact with each other. The electrical performance of devices containing conductive polymer compositions can be improved by minimizing the exposure of the composition to oxygen. One approach is to cover some or all of the composition with a protective layer.

Oxygen barrier layers for positive temperature coefficient (PTC) devices are described, for example, in U.S. Pat. No. 4,315,237 (Middleman et al.). One type of barrier layer contains a physical barrier material, such as a conventional epoxy composition, silicone resin, or insulating tape. Another type of barrier layer contains an oxygen barrier material, which exhibits oxygen permeabilities that are at least an order of magnitude lower than those of physical barrier materials. Examples of oxygen barrier materials include polyvinyl alcohol (PVOH), poly(ethylene-co-vinyl alcohol) (EVOH), poly(ethylene naphthalate) (PEN), poly (vinylidene chloride) (PVDC) and polyacrylonitrile (PAN).

One disadvantage common to the oxygen barrier materials is that they are typically processed by thermoplastic processing techniques, in which the polymer is melted and applied to another substance while in the molten form. The high temperatures and special equipment necessary for processing these polymers can hinder their use as coatings for PTC devices, since it is difficult to form an acceptable seal between the oxygen barrier and the electrodes in the device. Solutions or emulsions of these polymers tend to have prohibitively high viscosities and/or to contain solvents or other additives that could damage one or more components of the device. Both of these techniques, when used with these conventional barrier polymers, can present difficulties in consistently forming adequate sealing between the barrier and the electrodes. Another disadvantage to some of these oxygen barrier polymers is their tendency to absorb water from the environment. This is particularly problematic for PVOH and EVOH, with the result that the oxygen permeability of these polymers is much greater when in an environment of high relative humidity.

It is desirable to provide electrical devices that can be protected from oxidation on a consistent basis and under a variety of environmental conditions. It is also desirable that any material used to protect the device could be applied through straightforward processing techniques.

BRIEF SUMMARY OF THE INVENTION

In a first aspect of the invention, there is provided an electrical device, comprising a first electrode; a second electrode; a conductive polymer layer separating the first and second electrodes and having an exposed surface not in contact with the first and second electrodes; and an oxygen barrier material comprising a thermosetting polymer component on the exposed surface of the conductive polymer layer. The conductive polymer layer comprises a mixture of a polymer and a conductive filler.

In a second aspect of the invention, there is provided a method of making an electrical device, comprising forming a laminate of a conductive polymer layer, a first electrode, and a second electrode; the conductive polymer layer comprising an exposed surface between the first and second electrodes; and covering at least a portion of the exposed surface of the conductive polymer layer with a oxygen barrier material comprising a thermosetting polymer component. The conductive polymer layer comprises a mixture of a polymer and a conductive filler.

In a third aspect of the invention, there is provided an electrical device, comprising a first electrode, a second electrode, and a conductive polymer layer separating the first and second electrodes and having an exposed surface not in contact with the first and second electrodes; and a thermoset polyamine-polyepoxide oxygen barrier comprising a polymer component on at least 90% of the exposed surface of the conductive polymer layer. The conductive polymer layer may comprise a mixture of a polymer and a conductive filler comprising nickel. At least 65 weight percent of the polymer component of the oxygen barrier material may comprise two or more groups selected from the group consisting of $>N—CH_2\text{-Aryl-}CH_2—N<$, >N-Aryl-N<, —O-Aryl-O—, —O(O═)C-Aryl-C(═O)O—, $—O(O═)C—CH_2\text{-Aryl-}CH_2—C(═O)O—$, and $—CH_2—CH(OH)—CH_2—$; wherein -Aryl- is selected from the group consisting of phenylene, naphthylene and anthracenyl.

BRIEF DESCRIPTION OF THE DRAWINGS

The invention is illustrated by the drawings in which.

DETAILED DESCRIPTION OF THE INVENTION

Figure 1:
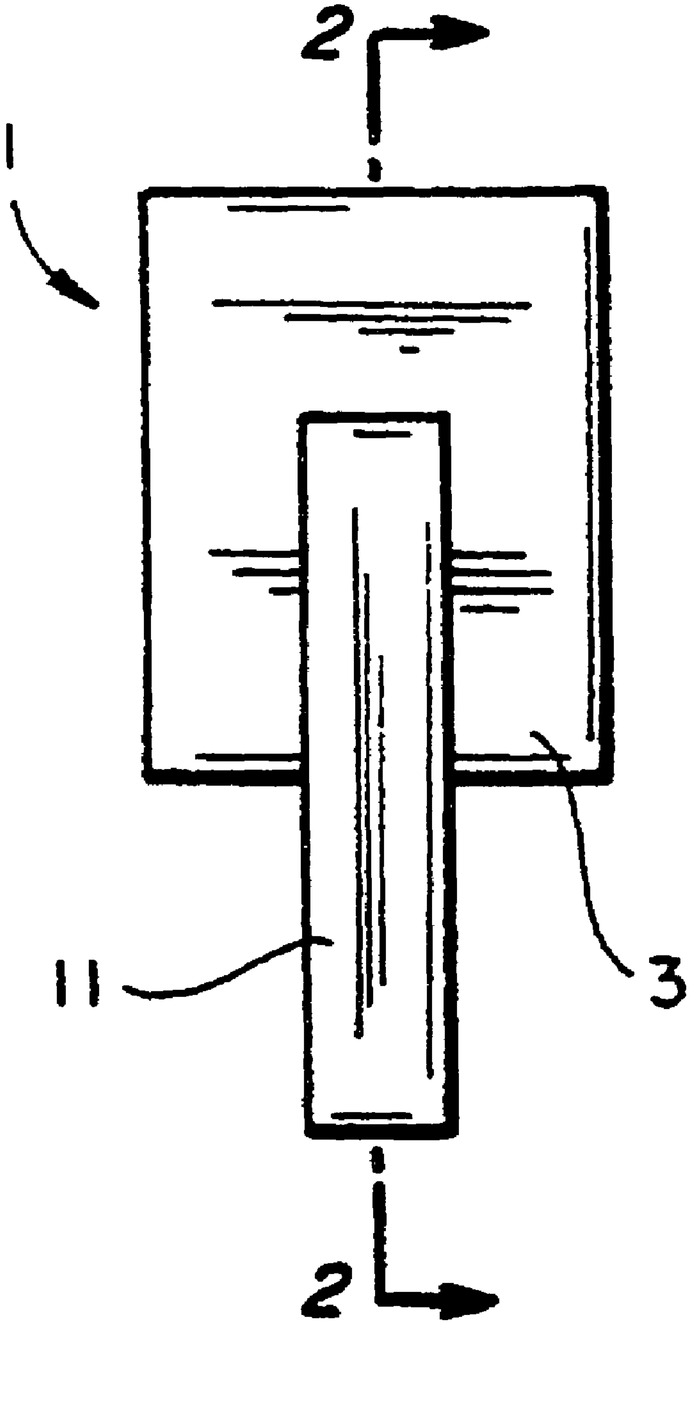
FIG. 1 is a plan view of a polymeric positive temperature coefficient (PPTC) device.

An electrical device includes a conductive polymer composition containing a conductive particulate filler, and an oxygen barrier coating on the conductive polymer composition. The conductive polymer composition may contain additional substances, such as non-conductive fillers and/or additional conductive fillers. The device further includes two laminar electrodes that are separated by a layer of the conductive polymer composition, leaving an exposed surface of the conductive polymer composition. This exposed surface is covered by the oxygen barrier coating so as to isolate the composition from the atmosphere. The oxygen barrier coating may further provide for an acceptable level of oxidation protection, even in environments of high relative humidity (RH).

An electrical device containing a conductive polymer composition and an oxygen barrier coating on the conductive polymer composition can be configured as, for example, a polymeric positive temperature coefficient (PPTC) device. A PPTC device exhibits positive temperature coefficient (PTC) behavior, which is characterized by a sharp increase in resistivity with temperature over a relatively small temperature range. Specifically, the term "PTC" as used herein is defined as a composition or device which has an $R_{14}$ value of at least 2.5 and/or an $R_{100}$ value of at least 10. Preferably, a PTC device or composition has an $R_{30}$ value of at least 6. The parameter $R_{14}$ is the ratio of the resistivities at the end and the beginning of a 14° C. range. The parameters $R_{30}$ and $R_{100}$ are the ratios of the resistivities at the end and the beginning of a 30° C. range and of a 100° C. range, respectively.

Preferred conductive polymer compositions comprise a conductive particulate filler dispersed in a host polymer. The compositions generally have a resistivity of less than 10 ohm-cm, preferably less than 1 ohm-cm, more preferably less than 0.1 ohm-cm, and more preferably still less than 0.05 ohm-cm.

It may be desirable for the polymer to be a semi-crystalline polymer. Semi-crystalline polymers are characterized by a melting temperature, which is the temperature above which the crystalline domains, or crystallites, in the polymer become disordered. The melting temperature ($T_m$) is conveniently measured by differential scanning calorimetry (DSC) as the peak of the temperature range at which there is an endothermic transition. Suitable semi-crystalline polymers include polyolefins, such as polypropylene, polyethylene, or copolymers of ethylene and propylene. Suitable semi-crystalline polymers may also include copolymers of at least one olefin and at least one non-olefin monomer copolymerisable therewith. Examples of these copolymers include poly(ethylene-co-acrylic acid), poly(ethylene-co-ethyl acrylate), poly(ethylene-co-butyl acrylate), and poly (ethylene-co-vinyl acetate). Suitable thermoformable fluoropolymers include polyvinylidene fluoride, and ethylene/tetrafluoroethylene copolymers and terpolymers.

For some applications, it may be desirable to use a blend of two or more polymers in order to achieve specific physical or thermal properties, such as flexibility or high temperature. When the host polymer is a semi-crystalline polymer, examples of secondary polymers that can be blended with the semi-crystalline polymer include elastomers, amorphous thermoplastic polymers, or other semi-crystalline polymers. For applications in which the composition is used in a circuit protection device, it is preferred that the host polymer is a semi-crystalline polymer such as polyethylene, particularly high density polyethylene, low density polyethylene, or a mixture of high density polyethylene and a copolymer. In compositions suitable for use in circuit protection devices in which the resistivity of the composition is less than 10 ohm-cm, the polymer generally comprises 35 to 75% by volume of the total composition, preferably 40 to 70% by volume.

The conductive particulate filler comprises particles made of a conductive material. Examples of conductive particulate fillers include carbon black and particles that are completely or partially composed of metal. The term "metal" is used herein to include an alloy, though a single metal or a mixture of single metals is preferred. For some applications, the particles may be completely metallic and contain only one type of metal, such as tungsten, copper, silver, molybdenum, or nickel. For other applications, the particles may comprise a non-conductive material such as glass or ceramic, or a conductive material such as carbon black, which has been at least partially coated with a metal to produce a filler with an appropriate resistivity. The particle may also comprise metal which has been coated with another material of a different conductivity, e.g. a metal, a metal oxide, or carbon, in order to provide particles with improved dispersive tendencies, decreased arcing tendencies, improved hardness, or controlled resistivity. Thus, for example, nickel is commonly coated with a nickel oxide layer which prevents excessive aggregation during compounding.

In general, the particulate filler comprises particles which have a resistivity of less than $10^{-3}$ ohm-cm, preferably less than $10^{-4}$ ohm-cm, particularly less than $10^{-5}$ ohm-cm. The conductive particulate filler is generally present in the composition at a loading of 20 to 50% by volume of the total composition, preferably 25 to 45% by volume, particularly 30 to 45% by volume, e.g. 35 to 45% by volume. The conductive particulate filler may contain more than one type of particle, and thus may also contain carbon black, graphite, or a second metal or metal oxide.

It is desirable that the polymer and the particulate filler form an interpenetrating network. Because of this, especially when the conductive polymer is subjected to a melt-shaping step, the preferred particle size and shape of the particulate filler are partially dependent on the nature of the semi-crystalline polymer and the ability of the polymer to force the particles into a particular orientation or formation as the polymer crystallized from the melt. Those particles most often used generally have an average particle size of 0.1 to 50 μm, preferably 0.5 to 20 μm, particularly 1.0 to 10 μm, e.g. 1.0 to 5.0 μm. When the polymer comprises polyethylene, it is preferred that the average size of the particle be at least 1.0 μm, preferably at least 1.5 μm, particularly at least 2.0 μm.

Particles such as spheres tend to produce devices which exhibit large resistance increases during thermal and electrical tests, whereas particles such as flakes or fibers tend to produce devices which exhibit electrical instability. In order to achieve optimum electrical and physical characteristics, it is preferred that the metal particles have a structure of the kind which is often referred to as "filamentary" but which is not a simple filament of constant cross-section but is, rather, dendritic in form. Such filamentary particles comprise generally spherical metal "beads" which are fused together to form a branched chain. Examples of such filamentary particles are shown in a product brochure from International Nickel, Inc., "INCO Nickel Powders, Properties and Applications", December, 1983, the disclosure of which is incorporated herein by reference.

Appropriate metal fillers generally have a bulk density, $D_B$, of less than 1.3 g/cm$^3$, preferably less than 1.0 g/cm$^3$, particularly less than 0.8 g/cm$^3$. Bulk density, also referred to as apparent density, is the weight of a unit volume of powder in g/cm$^3$. The values set out herein are determined by following the procedure of ASTM B329, in which the weight of a known volume of a powder is determined under known conditions. Particularly useful compositions contain particulate metal fillers whose bulk density is q times the true density of the metal, $D_T$, where q is less than 0.15. The true or elemental density of the metal is the weight per unit volume expressed as g/cm$^3$ of the metal, or when the filler comprises a coated metal or metal-coated non-conductive particle, the density of the composite filler. Preferably, compositions contain particulate metal fillers whose bulk density is q times $D_T$, where q is less than 0.10, particularly less than 0.075, especially less than 0.065. Particularly preferred for use as the metal filler is a filamentary nickel available from International Nickel, Inc. under the tradename INCO™ 255, which has a bulk density of about 0.55 g/cm$^3$ and a true density of 8.9 g/cm$^3$. Other suitable filamentary nickel fillers available from Inco are sold under the tradenames INCO™ 210, INCO™ 270, and INCO™ 287.

In addition to the conductive particulate filler, the composition preferably comprises a non-conductive filler in an amount 0 to 20% by volume of the total composition, preferably 5 to 15% by volume, particularly 8 to 12% by volume. In order to avoid producing a material which has a viscosity too high to be melt-processed in standard compounding equipment such as an extruder, the total amount by volume of the conductive particulate filler and the non-conductive filler generally should be at most 65% by volume of the total composition. This upper limit is subject to the viscosity of the host polymer and the presence of other fillers, and may be different depending on the type of compounding equipment used. Suitable non-conductive fillers include alumina trihydrate, magnesium hydroxide, zeolites, quartz, and calcium hydroxide. Such a filler may impart resistance stability and/or flame retardancy to the composition. When the non-conductive filler is alumina trihydrate, it is preferred that it be in the form of X-alumina, which is also known as activated alumina.

The conductive polymer composition may also comprise other substances, such as antioxidants, inert fillers, radiation crosslinking agents (often referred to as prorads), stabilizers, dispersing agents, or other components. To improve the melt-processability of the composition, and to produce greater homogeneity, resistance uniformity, higher yields, and improved electrical life, a coupling agent, such as a titanate or zirconate coupling agent, may be used. The coupling agent is present at 0 to 5% by volume, preferably 0.5 to 3% by volume, particularly 0.75 to 2% by volume of the total composition, e.g. 0.75 to 1.75% by volume.

Dispersion of the conductive filler and other components may be achieved by melt-processing, solvent-mixing, or any other suitable means. In order to avoid mechanical fusion of the metal particles into aggregates during compounding, it is desirable that the metal be "diluted" or mixed with the other ingredients prior to melt-processing. Thus the metal can be preblended, e.g. by means of a V-mixer or a conical blender, with the nonconductive filler and/or the polymer. It is particularly preferred that the host polymer be in the form of a powder and that all of the components be premixed. Such preblending minimizes the formation of aggregates, which can act as sites for physical splitting of extruded sheet or as sites for electrical failure during testing of devices prepared from the composition.

The composition can be melt-shaped by any suitable method to produce devices. Thus, the composition may be melt-extruded, injection-molded, or sintered. For many applications, it is necessary that the composition be extruded or calendared into a sheet. The extruded sheet can be treated, such as by hot-pressing, to remove any melt fractures that may be formed during extrusion, as these cracks and voids are potential sites for arcing in a device. For most materials, an extrusion temperature of 15° to 115° C. higher than the melting point of the semi-crystalline polymer (as determined by the peak of melting on a differential scanning calorimeter trace) is needed. At temperatures below this range, the melt viscosity of the composition tends to be too high. At temperatures above this range, surging tends to occur in the die. Thus for compositions in which the polymer is high density polyethylene, a temperature range of 150° to 240° C. is generally appropriate. Mechanical stresses inherent in the melt-shaped compound can be relieved by heat-treatment, e.g. by heating at a temperature slightly above the melting point of the polymer in vacuum for a period of 2 to 48 hours.

Figure 2:
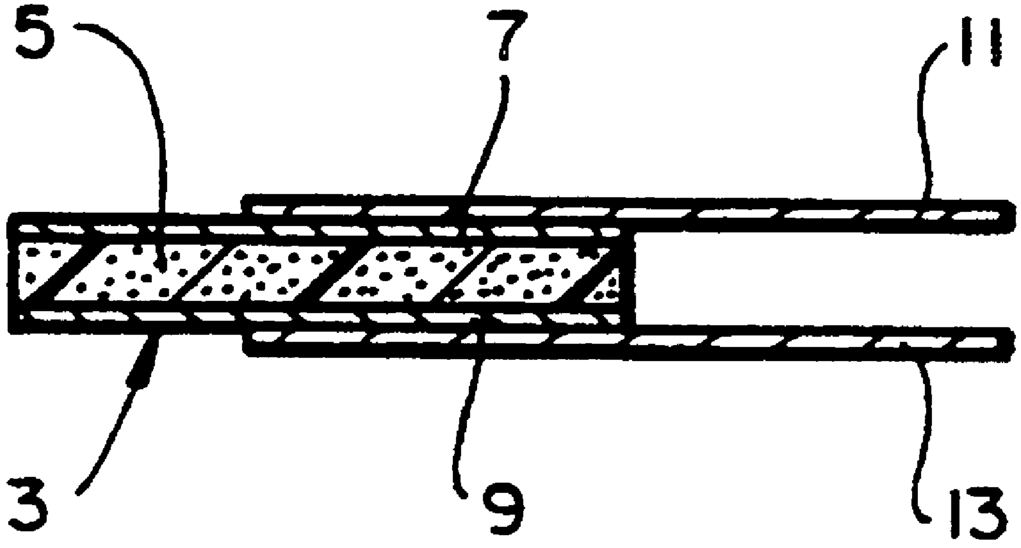
FIG. 2 is a cross-sectional view of the device of FIG. 1 along line 2-2.

The compositions containing a polymer and a conductive particulate filler can be used to prepare electrical devices, such as circuit protection devices, heaters, resistors, and thermal indicators. Although the circuit protection devices can have any shape, particularly useful circuit protection devices comprise two laminar electrodes, preferably metal foil electrodes, and a conductive polymer composition sandwiched between them. For example, FIG. 1 is a plan view of a circuit protection device 1 and FIG. 2 is a cross-sectional view of this device along line 2-2. The device consists of a PTC element or chip 3 to which are attached metal leads 11 and 13. The PTC element 3 comprises a conductive polymer composition 5 which is sandwiched between two metal electrodes 7 and 9. Particularly suitable foil electrodes are disclosed in U.S. Pat. No. 4,689,475 (Matthiesen), U.S. Pat. No. 4,800,253 (Kleiner et al.), and U.S. Pat. No. 6,570,483 (Chandler et al.), the disclosure of each of which is incorporated herein by reference.

Figure 3:
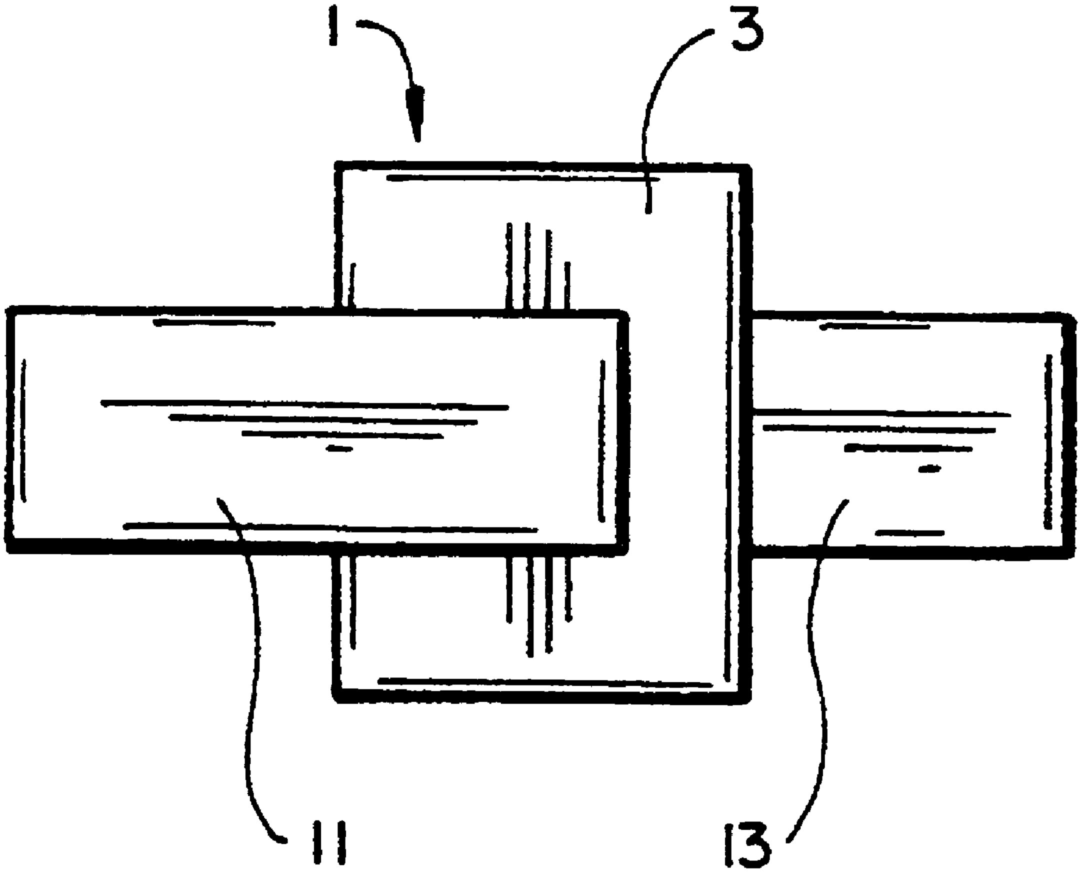
FIG. 3 is a plan view of another PPTC device.

A device usually comprises leads which are secured, e.g. soldered or welded, to the electrodes. These leads can be suitable for insertion into a printed circuit board or for surface mounting onto a printed circuit board. Circuit protection devices are particularly suitable for applications such as battery protection, in which the leads are in the form of ribbons or straps that are electrically connected to a substrate, such as a battery terminal. FIG. 3 shows an alternative configuration for the leads 11 and 13 to give a device suitable for attachment to the terminals of a battery. Because the resistance of the devices is so low, e.g. generally 0.0005 to 0.015 ohms, the resistance of the leads, even if composed of a low-resistance metal, can comprise a substantial proportion of the total device resistance. Thus the leads can be selected to influence or control the thermal properties of the device, including the rate at which the device trips into a high resistance state.

It may be desirable to crosslink the conductive polymer composition. Crosslinking can be accomplished by chemical reagents or by irradiation, such as by an electron beam or a $Co^{60}$ γ-irradiation source. The temperature of the composition preferably remains below the melting point of the polymer by a margin of at least 10° C., preferably at least 15° C., particularly at least 20° C., e.g. 25° to 30° C. If the temperature is allowed to increase, for example due to a high beam current, some crosslinking will tend to occur in the melt, resulting in a composition which exhibits a PTC anomaly at a lower temperature than expected.

During irradiation, stresses may be induced in the composition as a result of a non-uniform irradiation profile across the composition. Such stresses can produce a non-uniform crosslinking density, resulting in shrinkage and distortion of the sheet and delamination of foil electrodes. This is more likely to occur when irradiating a stack of individual sheets or laminates, each comprising two metal foils and a sheet of conductive polymer between the foils. In order to minimize the effects of the non-uniform irradiation profile, it may be helpful to irradiate the stack in several steps, interchanging the sheets or laminates between the steps to achieve uniform irradiation. For most compositions, the total dose is preferably at least 10 Mrads, but no more than 150 Mrads. Thus, irradiation levels of 10 to 150 Mrads, preferably 25 to 125 Mrads, particularly 50 to 125 Mrads, e.g. 75 to 125 Mrads, are useful. If the conductive polymer is to be laminated between sheet electrodes, irradiation may be conducted either before or after the lamination.

Preferably, devices containing a conductive polymer composition are coated with a thermoset oxygen barrier material that comprises a thermosetting polymer component. The term "oxygen barrier material" as used herein is defined as a substance having an oxygen permeability constant of less than 1 cc·mil/100 $in^2$·atm·day. This is a standard unit of permeation, measured as cubic centimeters of oxygen permeating through a sample having a thickness of one mil (0.001 inch (0.025 mm)) and an area of 100 inches square (0.065 $m^2$), where the permeation is measured over a 24 hour period and under a partial pressure differential of one atmosphere. Preferably, the oxygen barrier material of the coating possesses an oxygen permeability constant of less than 0.60 cc·mil/100 $in^2$·atm·day, more preferably less than 0.50 cc·mil/100 $in^2$·atm·day, even more preferably less than 0.30 cc·mil/100 $in^2$·atm·day. Preferably, when the oxygen barrier material of the coating is in an environment of 75% relative humidity, the material possesses an oxygen permeability constant of less than 0.60 cc·mil/100 $in^2$·atm·day, more preferably less than 0.50 cc·mil/100 $in^2$·atm·day, even more preferably less than 0.30 cc·mil/100 $in^2$·atm·day.

As used herein, the term "thermoset" refers to a polymeric material that cannot be melted and shaped again after its original formation is complete. This is in contrast to a "thermoplastic", which is a polymeric material that can be processed after its original formation by melting and shaping. Thermoset materials typically form insoluble and infusible networks in which the polymer chains are connected through crosslinks. The network formation, also referred to as "curing", can occur at elevated temperatures or at ambient temperature, depending on the chemical reactions involved and on the composition of the reactive components used to form the thermoset material. Preferably the network formation is slow enough to allow the reactive components of the thermoset material to be mixed and applied to an object prior to being locked into a final shape.

An example of a type of a thermoset oxygen barrier material is the family of polyamine-polyepoxide materials disclosed in U.S. Pat. No. 5,300,541 (Nugent) and U.S. Pat. No. 5,637,365 (Carlblom), which are incorporated herein by reference. Thermoset polyamine-polyepoxide oxygen barrier materials can be formed from a polyamine component and a polyepoxide component, where the two components are mixed immediately prior to application onto a PTC device. These materials can be used as oxygen barrier coatings in a variety of environments, including environments of high relative humidity (RH). For example, coatings formed from these materials can exhibit oxygen permeabilities at 75% RH that are no more than 5 times greater than the permeabilities at 50% RH, and preferably that are less than 3 times greater than the permeabilities at 50% RH.

The polyamine component may comprise a monomeric polyamine, or a polyamine functional adduct made by reacting an initial monomeric polyamine. Forming a polyamine functional adduct by a preliminary reaction has the advantage of increasing molecular weight while maintaining linearity of the resin, thereby avoiding gellation. Using a polyamine having no more than two primary amino groups ($-NH_2$) to make the adduct serves to avoid gellation. Additionally, the usual time period required for ingestion of epoxy and amine reactants before application onto a substrate is reduced or eliminated by pre-reaction to form an adduct. When an initial polyamine is prereacted to form an adduct, approximately 10 to 80 percent, preferably 20 to 50 percent, of the active amine hydrogens of the polyamine may be reacted with epoxy groups during formation of the adduct. Prereacting fewer of the active amine hydrogens reduces the effectiveness of the prereaction step and provides little of the linearity in the polymer product that is one of the advantages of forming the adduct. Prereacting larger portions of the active amine hydrogens is not preferred because sufficient active amine hydrogen groups must be left unreacted so as to provide reaction sites for reacting during the final curing step. Coatings may also be produced without forming an adduct if the requirement for an ingestion period can be tolerated. In this scenario, all of the polyepoxide required for curing may be blended with the initial monomeric polyamine. After allowing for an ingestion period, the mixture may be applied to the substrate and cured in place. Coatings produced by such a non-adduct approach may be considered theoretically equivalent to those produced using adduct.

Preferably, the polyamine component is characterized as having substantial aromatic content in its chemical structure. More specifically, at least 50 percent, preferably at least 70 percent of the carbon atoms are in aromatic rings, such as phenylene groups, naphthylene groups and/or anthracenyl groups. These may include aromatic amines in which the amine group is attached directly to the aromatic ring, or preferably aminoalkylene compounds in which amino group is attached to the aromatic group via an alkyl group. Preferably the alkylene group is a small alkylene group, most preferably a methylene group. In the latter case, when the aromatic group is phenylene, the polyamine is xylylenediamine.

In one example, a polyamine adduct is formed by reacting a monomeric polyamine with epichlorohydrin. By carrying out the reaction of polyamine with epichlorohydrin in the presence of an alkali, a primary reaction product comprises polyamine molecules joined by 2-hydroxypropylene linkages. The reaction of metaxylylenediamine, a preferred polyamine, with epichlorohydrin is described in U.S. Pat. No. 4,605,765 (Miyamoto, et al.), the disclosure of which is incorporation herein by reference, and such products are commercially available as "GASKAMINE™ 328" from Mitsubishi Gas Chemical Company.

Preferably, the polyepoxide component is characterized as having substantial aromatic content in its chemical structure. Preferably, the polyepoxide component has an average 1,2-epoxy functionality of at least about 1.4, and more preferably about 2.0 or greater, e.g. the polyepoxide has a 1,2-epoxy functionality of 2 to 4. Trifunctional and tetrafunctional polyepoxides are also useful in the present invention, including those that contain amine groups.

Examples of amine-containing tetrafunctional polyepoxides include N,N,N',N'-tetrakis(oxiranylmethyl)-1,3-benzene dimethanamine (available as "TETRAD™ X" from Mitsubishi Gas Chemical Co.); N,N,N',N'-tetrakis(oxiranylmethyl)-1,3-cyclohexane dimethanamine (available as "TETRAD™ C" from Mitsubishi Gas Chemical Co.); and tetraglycidyl-bis(para-amino phenyl) methane (available as "MY-720" from Ciba-Geigy). Other amine-containing polyepoxides include diglycidyl aniline and triglycidyl aminophenol.

The diglycidyl ethers of bisphenol such as diglycidyl ether of bisphenol A or diglycidyl ether of bisphenol F are not preferred, although they may be tolerated for the purpose of making the polyamine adduct. The cured molecular network may contain up to 30 percent by weight of the residue of bisphenol groups, but preferred embodiments contain none. If any bisphenol epoxies are to be included, diglycidyl ethers of bisphenol F are preferred over bisphenol A based epoxides for the sake of low oxygen permeability. It is theorized that the presence of methyl groups in bisphenol A has a detrimental effect on oxygen barrier properties. Thus, isopropylidene groups as contained in bisphenol A are preferably avoided. Other unsubstituted alkyl groups are believed to have a similar effect, particularly unsubstituted alkyl groups containing a carbon chain longer than two, and constituents containing such groups (e.g., diglycidyl ether of 1,4-butanediol) are preferably avoided.

In forming a cured barrier coating from the reaction of a polyamine with a polyepoxide, each amine hydrogen of the polyamine is theoretically able to react with one epoxy group and is considered as one amine equivalent. Thus, a primary amine nitrogen is considered as difunctional in the reaction with polyepoxides to form the barrier material. Preferably, the cured reaction product contains a substantial number of unreacted amine hydrogens. Maximizing the amount of polyamine reactant is generally desirable for the sake of maximizing barrier properties, but insufficient numbers of epoxy groups may not provide enough crosslinking to yield a strong, moisture resistant, solvent resistant film. Also, the use of more epoxy than the preferred amounts can produce excessive crosslinking and a film that is too brittle. When polyepoxides are employed in both the adduct-forming stage and the curing stage, they may be the same polyepoxide or they may be different polyepoxides. Mixtures of either the polyepoxides or polyamines that are recommended herein may be used in place of the pure compounds.

The cured polymeric network of the oxygen barrier coating comprises the residues of the polyamine and polyepoxide components. Preferably, the oxygen barrier coating is characterized as having a high content of aryl amine and/or aryl aminomethyl groups, and/or a high content of aryl ether and/or aryl ester groups, where the amine/aminomethyl moieties are preferably linked to the ether/ester moieties through 2-hydroxypropylene groups. Preferred aryl groups are phenylene, naphthylene, and anthracenyl groups. Preferably, the cured oxygen barrier material is characterized by a chemical structure in which the combination of the following groups comprises at least 65 percent, preferably at least 80 percent, most preferably at least 95 percent by weight of the cured network: $>N—CH_2-Aryl-CH_2—N<$, $>N-Aryl-N<$, —O-Aryl-O—, —O(O)C-Aryl-C(O)O—, $—O(O{=})C—CH_2-Aryl-CH_2—C({=}O)O—$, $—CH_2—CH(OH)—CH_2—$. In these formulas, the label "-Aryl-" represents a phenylene group, a naphthylene group, or an anthracenyl group. Preferably, the aryl group contains a meta-phenylene or 2,6-naphthalene moiety, including substituted derivatives thereof. It is also preferred that unsubstituted alkylene groups in the polyamine monomer contain two or fewer carbon atoms.

An example of an oxygen barrier material that consists essentially of these groups is the network formed by the reaction of an adduct of metaxylylenediamine and epichlorohydrin (polyamine component) with N,N,N',N'-tetrakis (oxiranylmethyl)-1,3-benzene dimethanamine (polyepoxide component). The desired molecular groups may be introduced into the cured polymeric network by the initial polyamine, the polyamine adduct, or the polyepoxide curing component. The various substitutions on the aromatic members described above may be provided in combination with each other on the same molecule in the reactants.

A mixture of the polyamine and polyepoxide components may be applied to a device in neat form or in a solvent. The application may involve conventional methods such as spraying, rolling, dipping, brushing and the like. Spray applications or roll applications are preferred. For example, conventional spray techniques and equipment for applying curable coating components can be utilized. Preferably, the cured oxygen barrier coating has a thickness less than 75 microns (μm). More preferably, the coating thickness is from 1 to 60 μm, and even more preferably is from 2 to 40 μm. It is preferred that 100% of the exposed surface area of the conductive polymer composition is covered by the oxygen barrier material. However, incomplete coverage can also provide useful devices. For example, the oxygen barrier coating may contain one or more pinholes without significantly damaging the PTC properties of a device. Preferably at least 90% of the exposed surface area of the conductive polymer composition is covered, and more preferably at least 99% of the exposed surface area is covered.

When applied from a solvent, the solution of the amine-functional polymeric resin ready for application will have a weight percent of resin solids in the range of from about 15 percent by weight to about 50 percent by weight, preferably from about 25 to about 40 percent by weight for embodiments employing the pre-reacted adduct approach. Higher weight percent solids may present application difficulties, particularly with spray application, while lower weight percentages will require removal of greater amounts of solvent during a heat-curing stage. For coating formation involving the direct reaction of the polyamine and polyepoxide, solids contents above 50 percent can be applied successfully.

If a solvent is used in applying the polyamine-polyepoxide coating, the solvent should be inert towards the exposed portions of the PTC device being coated. That is, the solvent preferably is not absorbed by the conductive polymer composition and preferably does not undergo a chemical reaction with the composition. Solvents may be selected for their ability to provide desirable flow properties to the liquid composition during its application to the device. Suitable solvents include oxygenated solvents, such as glycol ethers, e.g., 2-methoxyethanol, 2-ethoxyethanol, 2-propoxyethanol, 2-butoxyethanol, 1-methoxy-2-propanol and the like, or alcohols such as methanol, ethanol, propanol and the like. Glycol ethers, such as 2-butoxyethanol and 1-methoxy-2-propanol, are more preferred with 1-methoxy-2-propanol being most preferred. The use of 1-methoxy-2-propanol is preferred for its rapid evaporation rate, which minimizes solvent retention in the cured film. In order to obtain desired flow characteristics in some of the embodiments using a prereacted adduct, use of 2-butoxyethanol may be preferred. In applications not requiring slow evaporating solvents for the sake of flow properties, the solvents listed here may be diluted with less costly solvents such as toluene or xylene. The solvent may also be a halogenated hydrocarbon, for example, a chlorinated hydrocarbon, such as methylene chloride, 1,1,1-trichloroethane and the like (usually considered fast evaporating solvents), that may be especially useful in obtaining cured barrier films. Mixtures of such solvents may also be employed. Non-halogenated solvents are preferred where the resultant barrier material is desired to be halide-free. The resin may also be in an aqueous medium, i.e., the ungelled amine-functional polymeric resin may be an aqueous solution or dispersion. For example, when the polyepoxide used in curing the coating is a water-soluble polyepoxide, the ungelled amine-functional polymeric resin can be utilized as an aqueous solution. Otherwise, with water-insoluble polyepoxides, the ungelled amine-functional polymeric resin can have sufficient amine groups neutralized with an organic acid, such as formic acid, lactic acid, or acetic acid, or with an inorganic acid, such as hydrochloric acid or phosphoric acid, to allow solubilization of the ungelled amine-functional polymeric resin in an aqueous medium.

The oxygen barrier coating compositions may also include a filler. For example, the addition of pigments can further reduce the gas permeability of the resultant barrier material. Among the useful pigments in decreasing the gas permeabilities may be included titanium dioxide, micas, silica pigments, talc and aluminum or glass particulates, e.g., flakes. Micas, aluminum flakes and glass flakes may be preferred due to a plate-like structure of such pigments. Generally, when pigments are included in the coating compositions, the weight ratio of pigment to binder is less than about 1:1, preferably less than about 0.3:1, and more preferably from about 0.05:1 to about 0.2:1, the binder weight being the total solids weight of the polyamine-polyepoxide resin in the coating composition. The use of a filler in poyamine-polyepoxide oxygen barrier materials is disclosed, for example, in U.S. Pat. No. 5,840,825 (Carlblom et al.), which is incorporated herein by reference. Preferably, the filler is characterized as a platelet-type filler. Preferably, the platelet-type filler is present in the oxygen barrier material an amount ranging from about 2 to about 40 weight percent, more preferably from about 5 to about 40 weight percent, and even more preferably from about 5 to about 25 weight percent. Any suitable platelet-type filler that is compatible with the barrier coating composition described above can be used. Examples of such suitable fillers include mica, vermiculite, clay, talc, micaeous iron oxide, silica, flaked metals, flaked graphite, flaked glass, flaked phthalocyanine. It may be desirable to use mica, due to its commercial availability.

In addition to fillers, the oxygen barrier coating composition may include other additives. For example, silicones and/or surfactants may be added depending on the surface characteristics of the components of the device. In addition, coupling agents or catalysts may be present to influence the curing of the composition and/or its bonding to the device.

In application of a thermosetting oxygen barrier material onto a conductive polymer composition, the components of a coating composition, e.g., a polyepoxide and the polyamine, are first thoroughly mixed and then applied by appropriate means such as spraying. After mixing, the coating composition can also be held for a period of time (referred to as an ingestion time) from about 5 minutes to about 60 minutes prior to application to improve cure and clarity. This ingestion time can generally be eliminated when the polyamine is a prereacted adduct or when the solvent is 2-butoxyethanol. After application of the coating composition, it may be cured at temperatures as low as ambient temperature, i.e., about 21° C. (70° F.), by allowing for a gradual cure over several hours to several days or longer. However, such low temperature curing is slower than desired for commercial production lines and is not as efficient in removing solvent from the cured coating. Therefore, it is preferred that the coating be cured by heating at elevated temperatures as high as possible without distorting the plastic substrates and sufficiently high to effectively drive the particular solvent from the coating. For a relatively "slow" solvent, that is, a solvent having a relatively low evaporation rate, temperatures from about 54° C. (130° F.) to about 110° C. (230° F.), preferably from about 71° C. (160° F.) to about 93° C. (200° F.) for from about 1 minute to about 60 minutes may be suitable. For relatively "fast" solvent, that is, a solvent having relatively high evaporation rate, temperatures in the range of 100° F. to 71° C. (160° F.), preferably from about 49° C. (120° F.) to 66° C. (150° F.), may be suitable. The thermosetting coating composition may be applied and cured as a single layer or may be applied as multiple layers with one or more heating stages to remove solvent.

Electrical devices containing a conductive polymer composition and an oxygen barrier coating on the conductive polymer composition can have low resistivities. For example, the resistance of a device containing a metal-based conductive filler may be less than 1 ohm. Preferably, the resistance of a device containing a metal-based conductive filler is less than 0.50 ohm, and more preferably is less than 0.10 ohm, e.g. 0.015 ohm.

The invention is illustrated by the following Examples, in which Examples 1, 2, 3, and 6 are comparative examples.

EXAMPLE 1

Nickel-Containing PPTC Device

A conductive polymer composition was prepared by mixing 43 volume percent (vol %) Ni powder (INCO™ 255 from Inco Special Products, Wyckoff, N.J.), 47 vol % high density polyethylene (HDPE; PETROTHENE™ LB 832 from Equistar, Houston, Tex.), 10 vol % $MgOH_2$ (MAGNIFIN™ H10 from Lonza, Fair Lawn, N.J.), and 2 parts per hundred polymer (php) zirconate coupling agent (NZ-33 from Kenrich, Bayonne, N.J.). The composition was mixed in a Brabender mixer at 60 rpm for 10 minutes, at a temperature of 180° C. The mixed composition was then compression molded into a 0.51 mm (0.020 inch) square plaque having a thickness of 0.51 mm.

A laminate structure was prepared by positioning the conductive polymer plaque between two sheets of 0.025 mm-(0.001 inch-) thick electrodeposited nickel foil (Fukuda, Kyoto, Japan), and exposing the plaque and foil sheets to heat and pressure. This laminated structure was subjected to 100 Mrad irradiation to crosslink the composition. Individual chips having dimensions of 3 mm×4 mm were cut from the crosslinked laminate. A nickel strap lead having dimensions of 2.5 mm×15.5 mm was attached to the each of the nickel surfaces to form a device as illustrated in FIGS. 1 and 2.

EXAMPLE 2

Carbon Black-Containing PPTC Device

A conductive polymer composition was prepared by mixing 25 vol % carbon black powder (RAVEN™ 430U from Columbian Chemical (Marietta, Ga.), 60 vol % high density polyethylene (PETROTHENE™ LB 832), and 15 vol % $MgOH_2$ (5A from Kisuma, Veendam, the Netherlands). The composition was mixed in a Buss compounder and then extruded into sheet form.

The extruded polymer composition was then laminated and crosslinked as descried in Example 1, except that the center layer of polymer contained a stack of 4 extruded sheets to give a conductive polymer thickness of about 2.0 mm (0.080 inch). Individual chips having dimensions of 140 $mm^2$ (0.217 $in^2$) were cut from the crosslinked laminate. A lead was attached to each of the nickel surfaces to form a device as illustrated in FIGS. 1 and 2. The leads were formed by solder dipping using 22AWG tin-plated copper leads.

EXAMPLE 3

Epoxy Coated Ni-Containing Device

A device as formed in Example 1 was coated with Loctite™ 3981™ Hysol™ epoxy (Henkel Loctite Corp., Rocky Hill, Conn.). The device was placed in a mold and the epoxy resin was poured around the device into the mold. The mold was then placed in an oven for curing at 125° C. for 30 minutes; after curing, the coated devices were removed from the mold. The coating thickness was about 300-350 μm.

EXAMPLE 4

Polyamine-Polyepoxide Coated Ni-Containing Device

A device as formed in Example 1 was coated with BAIROCADE® BEER GRADE polyamine-polyepoxide (PPG; Springdale, Pa.). The device was brushed with a liquid mixture of the polyamine-polyepoxide precursor, and then placed in an oven at 125° C. for 5 minutes. Second and third layers were applied by repeating the brushing and oven heating steps twice. The total thickness of the coating layer was 25-30 μm.

EXAMPLE 5

Filled Polyamine-Polyepoxide Coated Ni-Containing Device

A device as formed in Example 1 was coated with a polyamine-polyepoxide containing 20 weight % of a platelet-type filler. The coating composition was prepared generally according to Example XVIII of U.S. Pat. No. 5,840,825 (Carlblom et al.), and included 12.5 wt % GASKAMINE™ 328 (Mitsubishi Gas Chemical Company), 7.5 wt % TETRAD X (Mitsubishi Gas Chemical Company), 71.1 wt % 1-methoxy-2-propanol (DOWANOL® PM, Dow Chemical Co.), 4.9 wt % aluminum silica clay (Engelhard Corp.), and 4.0 wt % ethyl acetate. The device was brushed with this mixture, and then placed in an oven at 125° C. for 5 minutes. Second and third layers were applied by repeating the brushing and oven heating steps twice. The total thickness of the coating layer was 25-30 μm.

EXAMPLE 6

Polyester Coated Carbon Black-Containing Device

A device as formed in Example 2 was coated with RANBAR polyester (Ranbar Technology; Manor, Pa.). The device was dipped in the polyester resin, dried at room temperature, and then placed in an oven for curing at 125° C. for 30 minutes. The total thickness of the coating layer was 40-50 μm.

EXAMPLE 7

Polyamine-Polyepoxide Coated Carbon Black-Containing Device

A device as formed in Example 2 was coated with BAIROCADE® BEER GRADE polyamine-polyepoxide. The device was brushed with a liquid mixture of the polyamine-polyepoxide precursor, and then placed in an oven at 125° C. for 5 minutes. Second and third layers were applied by repeating the brushing and oven heating steps twice. The total thickness of the coating layer was 25-30 μm.

EXAMPLE 8

Polyamine-Polyepoxide and Polyester Coated Carbon Black-Containing Device

A device as formed in Example 2 was coated with both RANBAR polyester and BAIROCADE® BEER GRADE polyamine-polyepoxide. The device was dipped in Ranbar resin, dried at room temperature, then placed in an oven for curing at 125° C. for 30 minutes to give a layer approximately 40-50 μm thick. The device was then brushed with a liquid mixture of the polyamine-polyepoxide precursor, and then placed in an oven at 125° C. for 5 minutes. Second and third layers were applied by repeating the brushing and oven heating steps twice. The total thickness of the polyamine-polyepoxide coating layer was 25-30 μm.

Aging Test of Coated Devices

The devices of Examples 1 and 3-8 were subjected to an aging test, in which the device was held at a voltage above the voltage required to trip the device into a resistive state. The resistance was then measured as a function of time. It is desirable for a PPTC device to maintain the initial resistance for as long as possible. For the Ni-containing devices of Examples 1, 3-5, the applied voltage was 12 V. For the carbon black-containing devices of Examples 6-8, the applied voltage was 60V.

Figure 4:
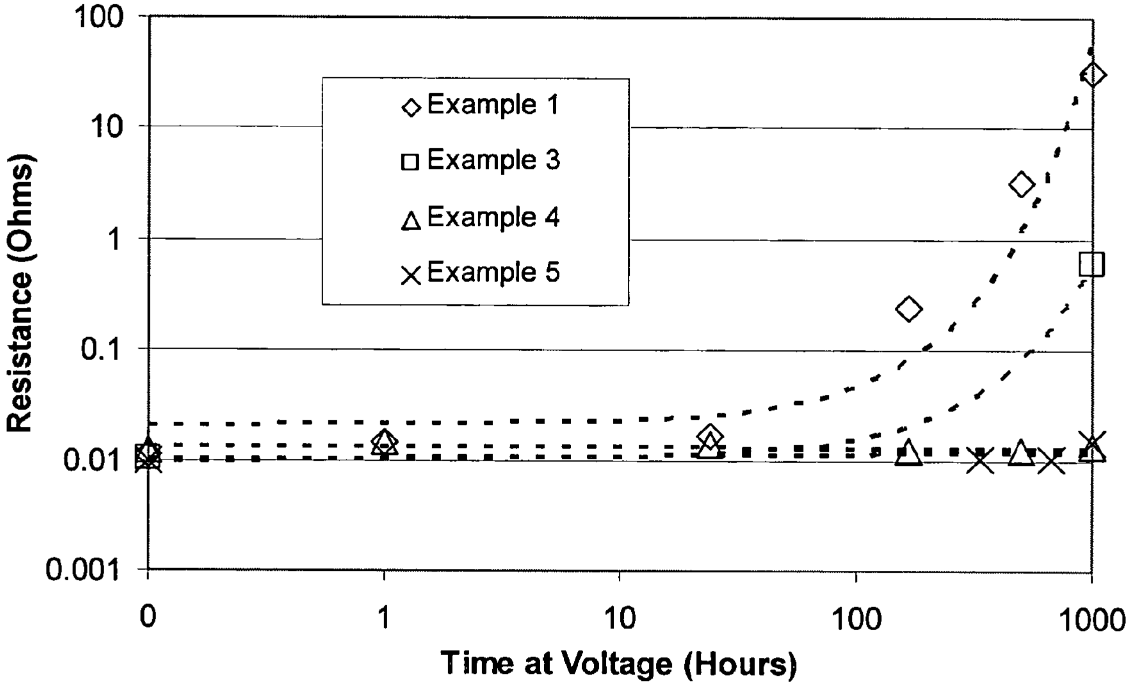
FIG. 4 is a graph of aging data for Ni-containing PPTC devices.

FIG. 4 is a graph of the aging results for the Ni-based devices. The device coated with the thermoset polyamine-polyepoxide exhibited the best results, maintaining its original resistance past 1,000 hours. In comparison, the device coated with a conventional epoxy coating showed an increase in resistance of almost two orders of magnitude at 1,000 hours, while the uncoated device showed an increase of over three orders of magnitude.

Figure 5:
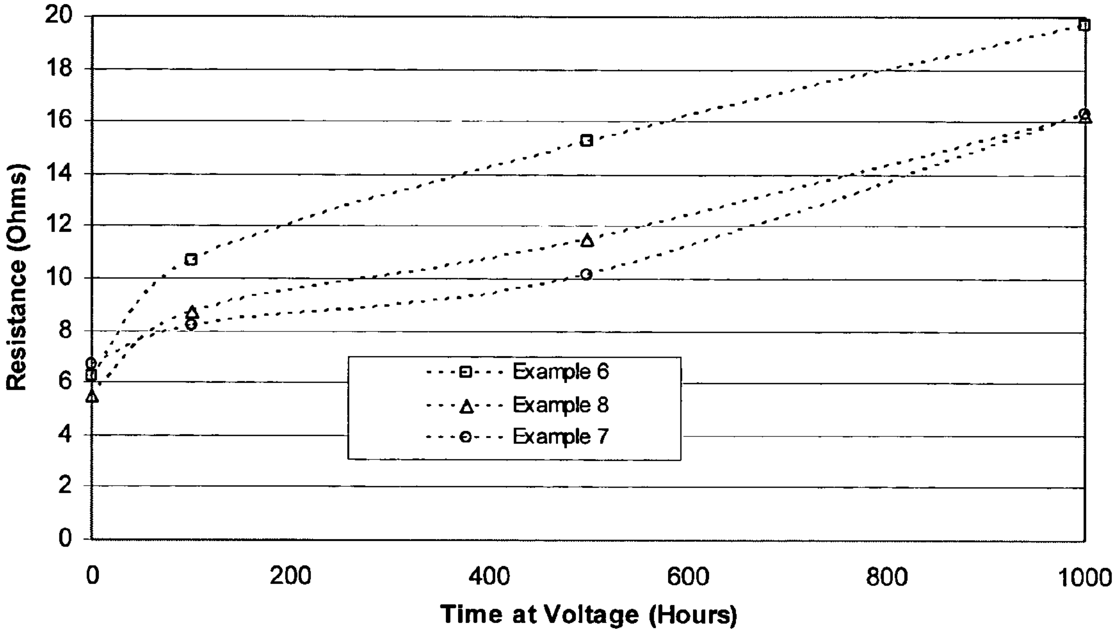
FIG. 5 is a graph of aging data for carbon black-containing PPTC devices.

FIG. 5 is a graph of the aging results for the carbon black-based devices. The device coated with the conventional polyester coating exhibited a much larger increase in resistance over time than did the devices that included the thermoset polyamine-polyepoxide coating.

It is therefore intended that the foregoing detailed description be regarded as illustrative rather than limiting, and that it be understood that it is the following claims, including all equivalents, that are intended to define the spirit and scope of this invention.

What is claimed is:

1. An electrical device, comprising:

a first electrode;

a second electrode;

a conductive polymer layer separating the first and second electrodes, said conductive polymer layer (i) having an exposed surface not in contact with the first and second electrodes, and (ii) comprising a mixture of a polymer and a particulate conductive filler which comprises nickel; and a thermoset oxygen barrier material comprising a thermosetting polymer component on the exposed surface of the conductive polymer layer, at least 65 weight percent of the polymer component of the oxygen barrier material comprising two or more groups selected from the group consisting of —N—$CH_2$-Aryl-$CH_2$—N, —N-Aryl-N,—O-Aryl-O—, —O(O═)C-Aryl-C(═O)O—, —O(O═)C—$CH_2$-Aryl-$CH_2$—C(═O)O—, and $CH_2$—CH(OH)—$CH_2$—; -Aryl- being selected from the group consisting of phenylene, naphthylene and anthracenyl.

2. The electrical device of claim 1, wherein the oxygen permeability constant of the oxygen barrier material is less than 0.60 cc·mil/100 $in^2$·atm·day.

3. The electrical device of claim 1, wherein the oxygen permeability constant of the oxygen barrier material is less than 0.50 cc·mil/100 $in^2$·atm·day.

4. The electrical device of claim 1, wherein the oxygen permeability constant of the oxygen barrier material is less than 0.30 cc·mil/100 $in^2$·atm·day.

5. The electrical device of claim 1, wherein the oxygen permeability constant of the oxygen barrier material is less than 1 cc·mil/100 $in^2$·atm·day, when in an environment of 75% relative humidity.

6. The electrical device of claim 1, wherein the oxygen barrier material covers at least 90% of the exposed surface of the conductive polymer layer.

7. The electrical device of claim 1, wherein the oxygen barrier material covers at least 99% of the exposed surface of the conductive polymer layer.

8. The electrical device of claim 1, wherein the oxygen barrier material covers 100% of the exposed surface of the conductive polymer layer.

9. The electrical device of claim 1, wherein the device is encapsulated by the oxygen barrier material.

10. The electrical device of claim 1, wherein the oxygen barrier material comprises a polyamine-polyepoxide material.

11. The electrical device of claim 1, wherein -Aryl- is selected from the group consisting of meta-phenylene and 2,6-naphthalene.

12. The electrical device of claim 1, wherein at least 80 weight percent of the polymer component of the oxygen barrier material comprises two or more groups selected from the group consisting of —N—$CH_2$-Aryl-$CH_2$-N—, —N-Aryl-N—, —O-Aryl-O—, —O(O═)C-Aryl-C(═O)O—, —O(O═)C—$CH_2$-Aryl-$CH_2$-C(═O)O—, and —$CH_2$—CH(OH)—$CH_2$—; wherein -Aryl- is selected from the group consisting of phenylene, naphthylene and anthracenyl.

13. The electrical device of claim 12, wherein -Aryl- is selected from the group consisting of meta-phenylene and 2,6-naphthalene.

14. The electrical device of claim 1, wherein at least 95 weight percent of the polymer component of the oxygen barrier material comprises two or more groups selected from the group consisting of —N—$CH_2$-Aryl-$CH_2$—N—, —N-Aryl-N—, —O-Aryl-O, —O(O═)C-Aryl-C(═O)O—, —O(O═)C—$CH_2$-Aryl-$CH_2$—C(═O)O—, and —$CH_2$—CH(OH)—$CH_2$—; wherein -Aryl- is selected from the group consisting of phenylene, naphthylene and anthracenyl.

15. The electrical device of claim 14, wherein -Aryl- is selected from the group consisting of meta-phenylene and 2,6-naphthalene.

16. The electrical device of claim 1, wherein the oxygen barrier material comprises from 2 to 40 weight percent of a platelet-type filler.

17. The electrical device of claim 1, having a resistance of less than 15 milliohms.

18. An electrical device, comprising:

a first electrode, a second electrode, and a conductive polymer layer separating the first and second electrodes and having an exposed surface not in contact with the first and second electrodes;

the conductive polymer layer comprising a mixture of a polymer and a particulate conductive filler comprising nickel; and a thermoset polyamine-polyepoxide oxygen barrier comprising a thermosetting polymer component on at least 90% of the exposed surface of the conductive polymer layer;

at least 65 weight percent of the polymer component of the oxygen barrier material comprising two or more groups selected from the group consisting of —N—$CH_2$-Aryl-$CH_2$—N—, —N-Aryl-N—, —O-Aryl-O—, —O(O═)C-Aryl-C(═O)O—, —O(O═)C—$CH_2$-Aryl-$CH_2$—C(═O)O—, and —$CH_2$—CH(OH)—$CH_2$—; wherein -Aryl- is selected from the group consisting of phenylene, naphthylene and anthracenyl.

* * * * *